Figure 1:
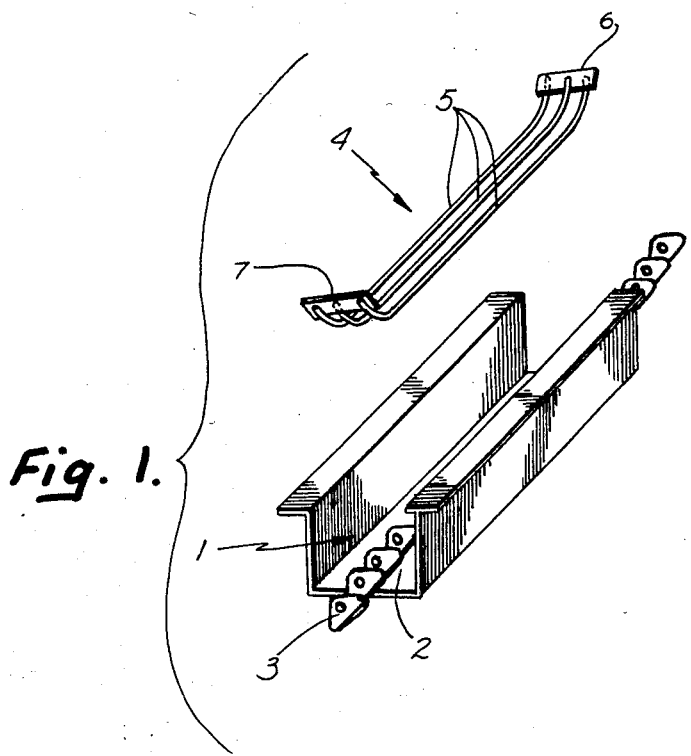

United States Patent [19]

Peckskamp

[11] Patent Number: 4,603,657
[45] Date of Patent: Aug. 5, 1986

[54] FEED TROUGH FOR POULTRY CAGES, ESPECIALLY PULLET CAGES

[75] Inventor: Hubert Peckskamp, Lohnr, Fed. Rep. of Germany

[73] Assignee: USI Agri-Business Company Inc., New Holland, Pa.

[21] Appl. No.: 712,278

[22] Filed: Mar. 15, 1985

[30] Foreign Application Priority Data

Mar. 15, 1984 [DE] Fed. Rep. of Germany ....... 3409507

[51] Int. Cl.$^4$ .......................................... A01K 39/014
[52] U.S. Cl. ................................. 119/18; 119/51 CF; 119/52 AF
[58] Field of Search ........... 119/51 R, 51 CF, 52 AF, 119/18

[56] References Cited

U.S. PATENT DOCUMENTS 2,252,348  8/1941  Mager ............................ 119/18 X
3,492,970  2/1970  Keen et al. ......................... 119/18
4,351,273  9/1982  Holland et al. ................... 119/51 R Primary Examiner—Hugh R. Chamblee
Attorney, Agent, or Firm—Price, Heneveld, Huizenga & Cooper

[57] ABSTRACT

In a feed trough for poultry battery cages, particularly chick breeding cages, comprising a trough channel with a feed conveyor running therein and with a grid disposed thereabove, provision is made for each grid to consist of grid bars extending parallel to one another in the longitudinal direction of the trough channel and joined to one another only in their end regions.

The end regions of the grid are bent over towards the channel opening. The cross connections provided for the grid bars are end plates which can be laid against partitions laterally bounding a cage. The grid is in the form of a part which can be inserted into the trough channel.

16 Claims, 2 Drawing Figures

U.S. Patent     Aug. 5, 1986     4,603,657

FEED TROUGH FOR POULTRY CAGES, ESPECIALLY PULLET CAGES

The invention relates to a feed trough for poultry battery cages, particularly chick breeding cages, comprising a trough channel with a feed conveyor chain running therein and with a grid disposed thereabove In feed troughs of this kind the feed conveyor chain serves to distribute feed from a charging point over the length of the trough channel. The latter extends over the entire width of individual cages disposed side by side and separated from one another by side partitions. The partitions generally extend into the trough channel and then have a bottom cutout through which the feed conveyor chain passes and through which the feed conveyed by the chain can also be transported.

In order to prevent the birds from coming into contact with the conveyor chain, which slides over the bottom of the trough channel after the style of a scraper chain, grids are inserted into the trough channel associated with each cage, in such a manner that the birds can still reach the food lying under them, while however the conveyor chain remains inaccessible.

In an arrangement of this kind it is found to be disadvantageous that the birds can reach the feed through the openings in the grid only when there is a sufficient level of feed. Such a level of feed can of course be maintained by replenishment, which can be effected with the aid of the conveyor chain, but it is then no longer possible for the feed troughs to be completely emptied by the birds, particularly immediately before the cages are cleared out. Losses of feed must therefore be accepted for every breeding batch.

A grid could of course be installed at a lower level, but the lowering of the level of the feed that can be achieved in this way is cancelled out again by the increased risk of injury to the birds on the conveyor chain, which then runs in the feeding region.

Precisely in the case of chick breeding it can be observed that young, freshly introduced chicks, in particular, even rest on the grids and pass their heads and extremities through the openings in the grid. When the conveyor chain is operated, the birds may become jammed and be unable to free themselves. The cutting action of the crossbars of the grids then inflicts serious injuries on the birds, who have to be regarded as breeding casualties.

Other disadvantages of known grids result from feed congestion. With the relatively high level of feed in the trough channel, which is necessary in order to avoid injuries, feathers jammed on the cross-bars of the grids hinder the movement of the feed when the conveyor chain is moving. As the conveying of the feed then continues, the accumulation of feed at the congestion points results in feed passing over the top edge of the opening of the trough channel and thus being lost. At the same time, when congestion occurs the other cages downstream of the congestion point will be inadequately supplied with feed.

The problem underlying the invention is that of improving a feed trough in respect of the conveying, distribution, and reception of feed, and avoiding injuries to the caged birds.

With a feed trough of the type under discussion this problem is solved in that each grid consists of grid bars which extend parallel to one another in the longitudinal direction of the trough channel and which are joined together only in the region of their ends.

A grid of this kind has the advantage that there are no grid bars directed transversely to the longitudinal axis of the trough channel. All the grid bars extend in the longitudinal direction of the trough channel and thus are also parallel to the direction of movement of the conveyor chain. The danger of injury to the birds when the conveyor chain is moving, through jamming in the grid bars, no longer exists. The congestion of feed, for example because of feathers, likewise no longer occurs. In an advantageous manner the birds have substantially freer access to the feed. Because of the reduced risk of injury, the grid bars can be seated very low in the trough channel, so that an advantageously low level of feed can be maintained. The grid bars can be seated at so low a level that they practically lie on the conveyor chain. Consequently, the birds can almost completely empty the trough of feed, which is important, for example, in the case of controlled feeding. A completely emptied feed trough is also advantageous before the cages are cleared out, so that no residues of feed remain.

According to a further development, provision is made for the end regions of the grid to be bent out in the direction of the grid opening. In accordance with the bend, the distance between the grid bars and the conveyor chain running under them is increased in the end regions. Regions are thus formed in which any birds which may nevertheless become jammed between the grid bars and the moving conveyor chain can be automatically freed. With a total length of the grid according to the invention of for example 95 cm, the ends of the grid are bent upwards by about 35° & over a length of about 5 cm.

The outer ends of the grid bars are joined together. These connections serve as spacers for the individual grid bars or cross-connectors. Because of the bent end regions, the cross-connectors of the grid bars lie relatively high above the conveyor chain. The cross-connectors can for example be formed by joining together the ends of the grid bars. According to an expedient further development, however, provision is made for the cross-connectors of the grid bars to be in the form of end plates which are adapted to be laid against partitions laterally bounding the cage. An end plate of this kind may for example be a metal sheet of dimensions such that support is provided on the walls bounding the feed trough and the side walls of the cage.

This arrangement is advantageous particularly when the grid is in the form of a part adapted to be inserted into the trough channel. Suitable dimensions of the end plates enable relatively chatter-free seating of the grids in the trough channels to be achieved.

The grid bars themselves are preferably round sections of metal, for example steel, which may have a diameter of 5 mm. Three or four such grid bars can be disposed parallel side by side to form a grid in accordance with the invention, the end regions being bent away and welded to an end plate as cross-connector.

In this arrangement it is also advantageous for the grid bars in a middle region to be fastened, for example, on the upper face of the end plates, while side grid bars are in each case fastened on the lower faces of the end plates. The grid bars are thus off-set in height in relation to one another. Side bars can then lie directly on side regions of the chain, while the central grid bars lying in a higher plane are at a determined distance from the chain, depending on the shape of the latter. This distance, or the offset of the grid bars, can be so determined that projections existing on the chain can pass through under the central grid bars.

Figure 2:
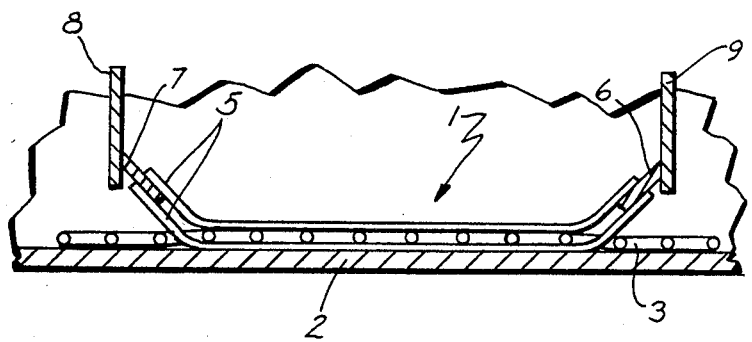

One example of embodiment of the invention, from which further inventive features emerge, is illustrated in the drawings, in which:

FIG. 1 is a view in perspective of a feed trough for a poultry cage, in the trough channel of which a feed conveyor chain runs, while a grid can be inserted into said trough channel, and FIG. 2 is a schematic side view of a feed trough in section, showing the conveyor chain and the inserted grid.

FIG. 1 shows schematically a perspective view of a feed trough. In the trough channel 1 of the feed trough extends a feed conveyor chain 3 sliding on the bottom 2 of the trough channel. A grid 4 is adapted to be inserted into the trough channel 1. In this example of embodiment the grid consists of three grid bars 5 which extend parallel to one another and which are joined together by end plates 6 and 7 only in the region of their ends. The end regions of the grid 4 are bent upwards, as shown. The two outer grid bars are fastened by their ends on the lower face of the respective end plates 6 and 7, for example by welding. On the other hand, the central grid bar is fastened on the upper face of the end plates 6 and 7.

FIG. 2 is a schematic longitudinal section through the trough channel 1. The feed conveyor chain slides on the bottom 2 of the trough channel. The feed conveyor chain is covered by the grid bars 5 of the grid 4 (FIG. 1). FIG. 2 shows that the end regions of the grid are bent upwards, so that the end plates 6 and 7 used as cross-connectors are applied against partitions 8 and 9 laterally bounding a cage.

I claim:

1. A feed trough for poultry battery cages, particularly chick breeding cages, comprising a trough channel with a feed conveyor chain running therein and with a grid disposed thereabove, wherein each grid consists of grid bars extending in a parallel relationship to one another in the longitudinal direction of the trough channel; cross connection means located only at the end regions of said grid bars for supporting said grid bars in said parallel relationship; and support means for supporting the grid bars in one predetermined position within said trough channel.

2. A feed trough as claimed in claim 1, wherein side grid bars are offset to a lower level than central grid bars.

3. A feed trough as claimed in claim 1, wherein the end regions of the grid are bent over towards the channel opening.

4. A feed trough as claimed in claim 3 wherein said support means is partitions laterally bounding a cage and said cross connection means provided for the grid bars are end plates laid against said partitions.

5. A feed trough as claimed in claim 3 wherein the grid is in the form of a part which can be removably inserted into the trough channel.

6. A feed trough as claimed in claim 3 wherein each grid bar is a round section.

7. A feed trough as claimed in claim 3 wherein side grid bars are offset to a lower level than central grid bars.

8. A feed trough as claimed in claim 1, wherein said support means is partitions laterally bounding a cage and said cross connection means provided for the grid bars are end plates laid against said partitions.

9. A feed trough as claimed in claim 8 wherein the grid is in the form of a part which can be removably inserted into the trough channel.

10. A feed trough as claimed in claim 8 wherein each grid bar is a round section.

11. A feed trough claimed in claim 8 wherein side grid bars are offset to a lower level than central grid bars.

12. A feed trough as claimed in claim 8, wherein the grid is in the form of a part which can be removably inserted into the trough channel.

13. A feed trough as claimed in claim 12 wherein each grid bar is a round section.

14. A feed trough as claimed in claim 12 wherein side grid bars are offset to a lower level than central grid bars.

15. A feed trough as claimed in one of claim 1, wherein each grid bar is a round section.

16. A feed trough as claimed in claim 15 wherein side grid bars are offset to a lower level than central grid bars.

* * * * *